Aug. 28, 1956     S. ROBSON ET AL     2,760,770
CONDENSER USED IN ZINC PRODUCTION
Filed July 29, 1953     7 Sheets-Sheet 6

Inventors
STANLEY ROBSON AND
LESLIE JACK DERHAM
By
Attorneys

United States Patent Office 2,760,770
Patented Aug. 28, 1956

2,760,770

CONDENSER USED IN ZINC PRODUCTION

Stanley Robson, Enfield, and Leslie Jack Derham, Severn Beach, England, assignors, by mesne assignments, to Metallurgical Processes Limited and The National Smelting Company Limited, carrying on business together under the name of Metallurgical Development Company, Nassau, Bahamas Original application March 11, 1949, Serial No. 80,916, now Patent No. 2,671,725, dated March 9, 1954. Divided and this application July 29, 1953, Serial No. 377,641

17 Claims. (Cl. 266—15)

This application is a division of application 80,916 filed March 11, 1949, now Patent 2,671,725, granted March 9, 1954.

This invention relates to the production of zinc and has for its object improvements in the method of and apparatus for producing zinc. The invention relates more particularly to the recovery of zinc from a body of molten lead that has been used as a condensing medium for zinc vapor obtained in zinc smelting operations.

Prior proposals to use molten lead as a condensing medium for zinc vapor obtained in smelting operations have not met with much favor. One of the main reasons, of course, is the cost of the large amount of lead that must be employed. Another is the difficulty of recovering the small amount of zinc from the large amount of lead in a satisfactory manner. In view particularly of renewed efforts to find a way commercially to smelt zinc bearing materials in a blast furnace, attention is again directed to the possibility of using molten lead as a condensing medium for zinc vapor.

Gaseous mixtures containing zinc vapor, carbon monoxide, and a substantial amount of carbon dioxide are especially difficult to treat in a zinc condensing operation because of the tendency of the carbon dioxide to react with the zinc to form an objectionable amount of the zinc oxide. The following composition is typical of the gaseous mixtures derived from blast-furnace smelting of zinc-bearing ores, residues or the like:

| | Percent by volume |
|---|---|
| Zinc vapour | 5 |
| $CO_2$ | 5 |
| $CO$ | 27 |
| $N$ | 63 |

Zinc-bearing gaseous mixtures of similar type can also be derived from the electro-thermic smelting of zinc, but in this case the zinc content is usually rather higher and the $CO_2$ content may be rather less.

A method of condensing and recovering the zinc values from a gaseous mixture of the type referred to is disclosed in our co-pending application Serial No. 535,290 filed May 12, 1944, now Patent No. 2,464,262 issued March 15, 1949, of which the present application is a continuation-in-part. The method of condensing comprises bringing the gaseous mixture while still hot into intimate shock-chilling contact with circulating molten lead in a condensing zone maintained at a temperature not greater than 550° C. to cause the gaseous mixture to cool to a temperature below that at which the carbon dioxide can react with the zinc to form objectionable zinc oxide, condensing the zinc vapor in the lead and accumulating a body of the solution.

The method of recovering the condensed zinc comprises cooling the lower portion of the body of lead-zinc solution to a temperature below 418° C., but not below the melting point of lead, to precipitate zinc therefrom while maintaining the upper portion of the body of the solution above 418° C., permitting the precipitated zinc to rise into the upper portion of the body of solution with the resultant remelting of the zinc and the formation of a supernatant layer of molten zinc, removing molten zinc from this supernatant layer and returning the molten lead from which the zinc was precipitated for re-use in the condensing step.

While this method of recovering condensed zinc from molten lead has given excellent results, we have found that when the lower portion of the lead-zinc solution is cooled to a temperature as low as 418° C., some of the precipitated zinc crystals tend to adhere to the sides of the vessel in which they are precipitated. Unless scraped from the sides of the vessel, the crystals tend to build up and thus to insulate the vessel. To this extent, at least, the method is a drawback and leaves something to be desired.

Investigation confirms our discovery that zinc may be recovered from molten lead used as a condensing medium for zinc vapor and that drawbacks of the type mentioned may be avoided, while at the same time gaining certain other operating advantages.

In accordance wth the method of the invention for recovering zinc from a body of molten lead used in a condensing zone as a condensing medium for zinc vapor obtained in a smelting operation, the condensation of zinc vapor is continued until the zinc content of the molten lead builds up to a point corresponding to the saturation point of the lead for zinc at a temperature above the freezing point of the zinc but below the temperature of the lead in the condensing zone. The resulting lead-zinc solution is accumulated in a substantially quiescent body. The body of molten lead-zinc solution is cooled to a temperature above the freezing point of the zinc but at which dissolved zinc separates and rises to the top of the body of solution to form a supernatant layer of molten zinc and an underlying layer of molten lead. The supernatant layer of molten zinc is separated at least in part from the underlying layer of molten lead and solution containing the remaining molten lead is returned to the condensing zone for re-use in the condensing step.

Since the lead-zinc solution from the condensing zone is not cooled low enough to permit zinc crystals to precipitate, the molten zinc remains in solution in the molten lead. The temperature drop, however, is sufficient to cause molten zinc in solution to separate, in effect, and rise as such to the top of the body of solution. Since zinc has a lower specific gravity than lead, the molten zinc rises to the top while the molten lead settles to the bottom. The molten zinc at the top may be drawn off readily, and thus be recovered separately from the lead.

For a specific application of the method of the invention, reference may again be made to our prior method of recovering condensed zinc from molten lead, described above and as disclosed in our copending application. Instead of cooling the lead-zinc solution to such a low temperature as 418° C., the temperature is kept above 418° C., and precipitation of zinc crystals is avoided. In this connection, we found that if the body of molten lead coming from the condensing zone is saturated with zinc at the temperature at which the condensation is effected, any subsequent cooling of it will cause molten zinc to separate, or rather a molten solution of zinc-rich alloy whose lead content is very small and may be ignored, since further treatment will in any case be necessary if a high purity zinc is ultimately required.

Therefore, in accordance with the present invention, the condensation of zinc vapor in the circulating molten lead is continued until the zinc content of the molten lead exceeds at least 1.7% by weight; the lead-zinc solution is then accumulated in a substantially quiescent body which is allowed to cool sufficiently to permit some of the zinc dissolved therein to separate and rise as such to the top of the body of solution to form a supernatant layer of molten zinc and an underlying layer of molten lead, the supernatant layer of molten zinc being then separated, at least in part, from the underlying layer of molten lead and the solution containing the remaining molten lead being returned to the condensing zone for re-use in the condensing step.

Preferably the resultant lead-zinc solution is accumulated in a cooling zone removed from the condensing zone and the body of solution is cooled to a temperature below 500° C., but above the freezing point of zinc to facilitate the formation of the supernatant layer of molten zinc.

The necessity for recirculating the lead until the dissolved zinc content exceeds at least 1.7% arises from the fact, which can be verified from the phase diagram of the binary lead-zinc system, that at temperatures exceeding 418° C. the lead-rich component of the liquid phase contains 1.7% and upwards of zinc; hence, unless the total zinc content exceeds 1.7%, the zinc-rich component from which alone the zinc values can be recovered, will not be present at all.

The circulation of molten lead in the condensing zone by means of which the condensation of zinc from the gaseous mixture derived from the blast-furnace or other smelting apparatus is effected may be produced by means of a rotary paddle wheel or the like device operating in an enclosed condensing chamber and dipping into a pool of molten lead so as to produce a shower of molten lead through which the gaseous mixture derived from the smelting zone is compelled to pass, the molten lead being continuously withdrawn from the pool for transfer to the recovery zone, and the pool replenished with lead from which a part at least of the zinc values have been extracted.

The rotary paddle wheel may be replaced by an oscillating paddle or by a helical type rotor rotating on a vertical axis or by any other convenient device for showering the molten lead.

The condensing chamber is preferably arranged as close as possible to the outlet of the blast-furnace or other smelting apparatus so that the gaseous mixture issuing from the smelting zone reaches the condensing zone without any substantial loss of temperature. This is important, because the gases leave the smelting zone at a temperature not very much above the equilibrium temperature of the reaction between zinc vapour, carbon dioxide, carbon monoxide and zinc oxide, having regard to the composition of the gases usually encountered. The reaction is symbolized by $$Zn + CO_2 \rightleftharpoons ZnO + CO$$

At temperatures below the equilibrium temperature the reaction proceeds from left to right. The equilibrium temperature of this reaction increases as the $CO_2$ content of the gases is increased relatively to their other content; and the $CO_2$ content of the gases from a blast-furnace in particular, or, in some instances, from an electro-thermic furnace, is sufficiently high in relation to the content of zinc vapour and CO to raise the equilibrium temperature to a value not far short of that at which the gases leave the smelting zone, so that a relatively small drop of temperature between the smelting and condensing zones will be sufficient to reverse the reaction above-mentioned and cause the formation of objectionable zinc oxide.

The recovery zone comprises essentially a vessel into which the zinc-lead solution is delivered from the condensing zone and which is provided with means for withdrawing the supernatant layer of molten zinc or rather zinc-rich alloy from the top, and means for tapping the partially de-zinced molten lead from the bottom for return to the condensing zone. Suitable means may be provided for maintaining this vessel at the correct temperature.

The invention further contemplates a modification of the condensation step of the process in which the condensation is carried out in two stages with counterflow of the molten lead and gaseous mixture, the condenser being modified by subdividing it into two compartments, each containing a paddle-wheel or like showering device. The gaseous mixture is introduced into the compartment next the zinc-vapour producing component and transferred thence through an opening in the partition separating the compartments to the more remote compartment from which it is finally exhausted; and molten lead is introduced into the compartment remote from the zinc-vapour producer and withdrawn from the other compartment into which it flows via a connecting passage.

We have found that when operating with two-stage condensation in this manner, the former upper limitation of 550° C. on the temperature of the condensing zone can be relaxed as far as concerns the first stage of condensation in the compartment next the zinc-vapour producer, in which the temperature may rise to 600° C. or even 620° C., the second stage of condensation being conducted so that the rise of temperature of the lead therein is slight, the temperature of the lead leaving this stage being preferably below 500° C. and in any case no greater than 550° C.

Our experiments show that when two-stage condensation is employed in this manner the zinc-vapour-bearing gases are adequately shock-chilled in the first stage of condensation, and furthermore that dross formation in the condenser is minimised by keeping the temperature of the first stage of condensation above 550° C. and preferably up to about 600° C.

An embodiment of an apparatus suitable for the performance of the method of the invention is diagrammatically illustrated in the accompanying drawings, of which—

Figures 1, 6:
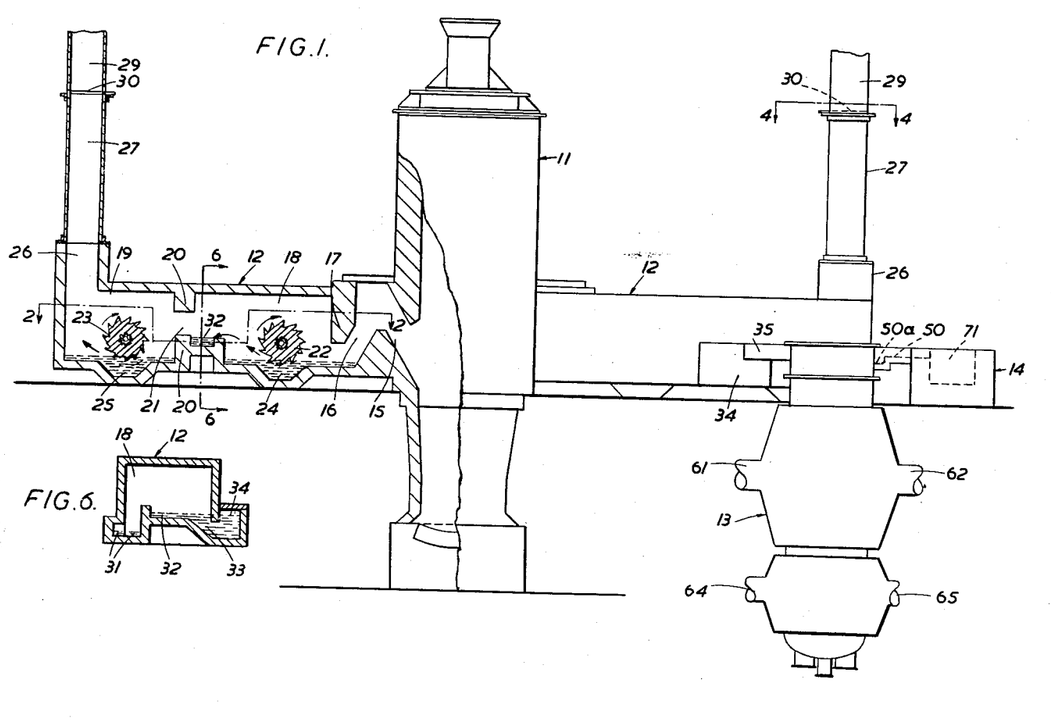
Figure 1 is a view, somewhat schematic, in side elevation of a zinc smelting and recovery plant, comprising a blast furnace and twin condenser assemblies including zinc-recovery apparatus, partly sectioned on the line 1—1 of Figure 2.
Figure 6 is an enlarged detail view in section on the line 6—6 of Figures 1 and 2.
Figures 2, 5:
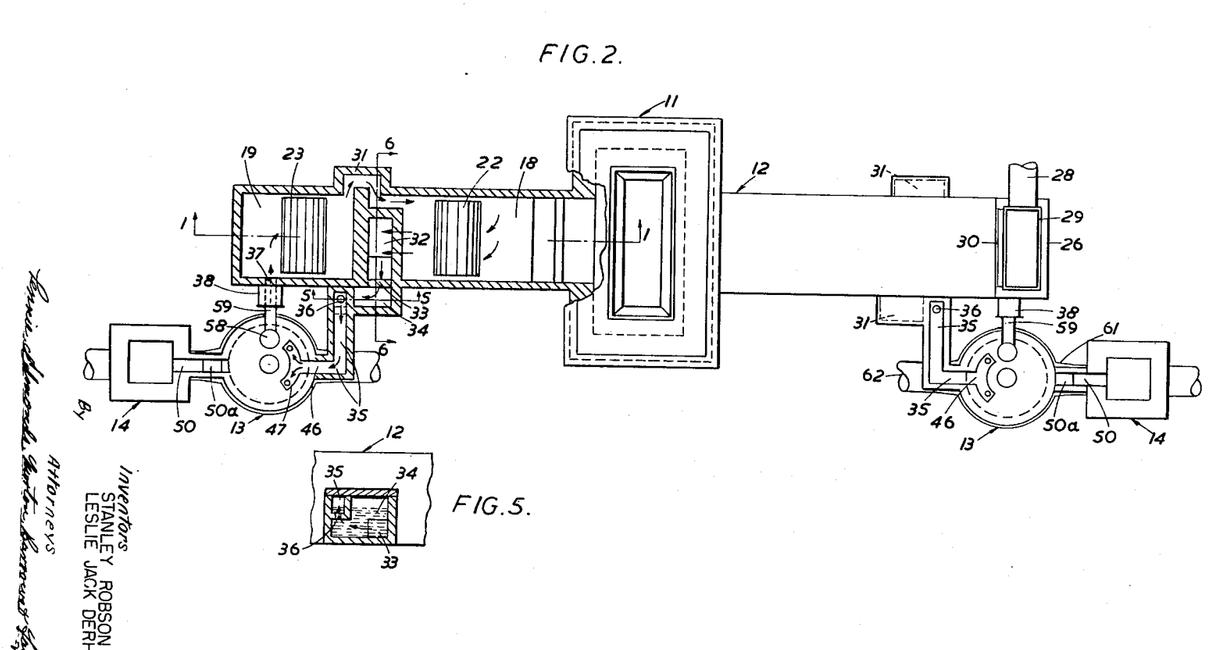
Figure 2 is a plan view, also somewhat schematic of the plant partly sectioned on the line 2—2 of Figure 1.
Figure 5 is an enlarged detail view in section on the line 5—5 of Figure 2.
Figure 3:
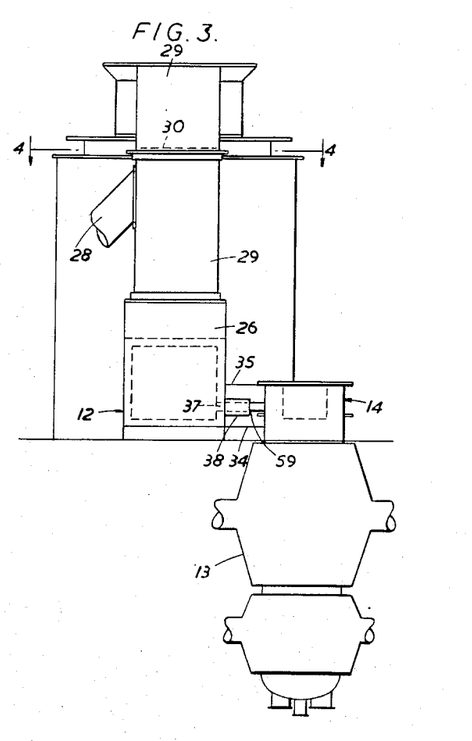
Figure 3 is a somewhat schematic view in end elevation of the plant.

The zinc smelting plant illustrated in Figures 1 to 3, comprises a blast furnace 11, twin condensers 12, zinc-separators 13, and zinc-collectors 14. The blast furnace gases containing nitrogen, carbon monoxide, carbon dioxide and zinc-vapour pass from the blast furnace into each condenser through an outlet 15 and a downwardly extending passage 16 beneath a hanging wall 17. The interior of each condenser 12, is subdivided into two compartments 18 and 19 by means of a partition 20 in which is an opening 21. In the compartment 18 is disposed a horizontal rotor 22, having buckets or pockets, formed in its circumference as shown in Figure 1. A similar rotor 23 is disposed in the compartment 19. Beneath the rotors 22, 23 respectively are sumps 24, 25. The rotors are revolved in the direction indicated by arrows in Figure 1 by mechanical means (not shown) situated outside the condenser.

Figure 4:
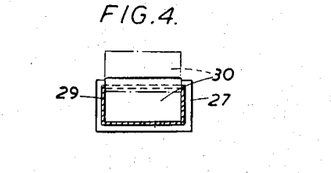
Figure 4 is a detail view in section on the line 4—4 of of Figures 1 and 3.

The condenser 12 terminates at the end remote from the blast furnace 11, in an outlet 26 communicating with an uptake 27 from which extends a downwardly sloping pipe 28 (see Figure 3) communicating with a gas-cleaning apparatus (not shown). From the top of the uptake 27 extends a stack 29 which is normally shut off from the uptake by means of a damper 30 shown in Figure 4 in the closed position by full lines and in the open position by dotted lines.

The compartments 18, 19 are connected at the bottom by a passage 31 (see also Figure 6). The base of the condenser is built up alongside the partition 20, inside the compartment 18 and in the built up part is provided a shallow transverse trough 32 (see also Figure 6), the walls of which are of unequal height, the wall forming the lower edge of the opening 21 being higher than the other. At the end remote from the passage 31 the floor of the trough 32 is sloped downwards to enable the trough to communicate through an opening 33 in the wall of the condenser with an external well, 34, the upper edge of the opening 33 being below the floor of the horizontal part of the trough 32. From the upper part of the well 34 a trough 35 (see also Figure 5), communicating with the well through an opening 36 in its floor, leads to the zinc separator 13. The well 34 and trough 35 are covered with a refractory roof, but for convenience of reading the drawings the roof is not shown. In the bottom of the wall of the compartment 19 of the condenser is an opening 37 from which extends a pipe 38 communicating with the pipe 59 of the zinc-separator 13, hereinafter described.

The zinc-separator 13 (Figure 7) comprises a cylindrical shell 39 of sheet steel with closed bottom, the sides of which are lined with a silicon carbide refractory 40, and the bottom with fire-brick 41. It is supported on a base 42 and has a drain 43 in the bottom, normally closed by a plug (not shown). The lining 40ª of the upper part is of silicon carbide refractory or firebrick and tapers internally to a neck 44, closed by a removable plug 45. The lining 40ª is extended on one side to accommodate a trough 46 forming a continuation of trough 35 (Figures 2 and 5) and on the opposite side to accommodate a trough 50 communicating with the zinc-collector 14 (see Figures 1 and 2), the latter being a rectangular pot made of any suitable refractory material, and having means (not shown) for tapping off the contents.

Figure 9:
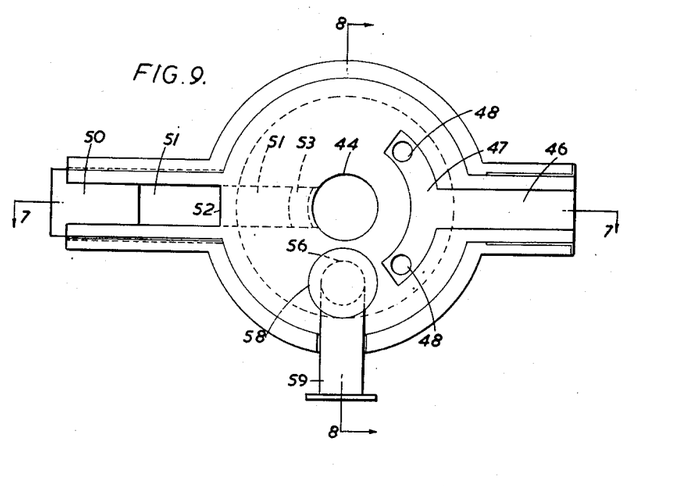
Figure 9 is a plan of the zinc-separating component.

The trough 46 is prolonged by an arcuate trough 47 (see Figure 9) from the ends of which two channels 48 extend downwardly in the mass of the lining 40ª terminating in openings 49 (Figure 7) in the interior of the chamber enclosed by the lining 40, 40ª.

Figure 7:
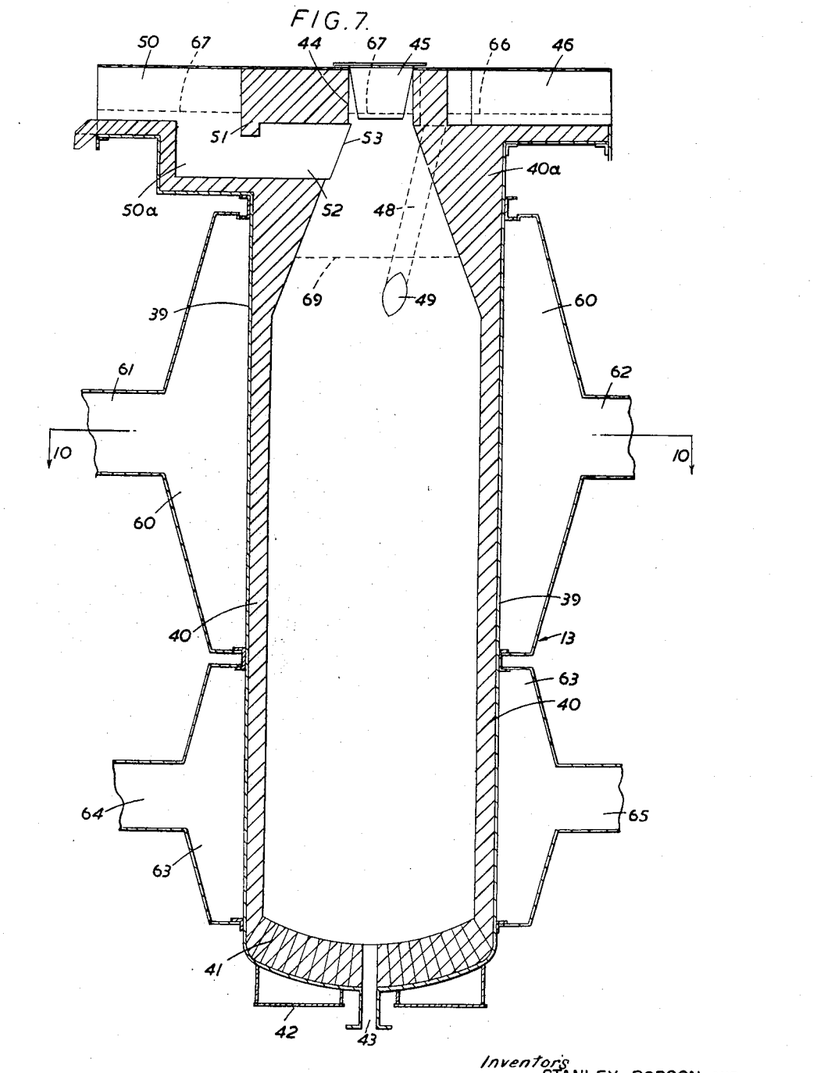
Figure 7 is a central vertical section of the zinc-separating component on the line 7—7 of Figures 9 and 10.

The trough 50 is deepend at its inner end to form a well 50ª and is extended beneath a hanging wall 51, whose lower edge is below the level of the floor of the trough 50, to form a channel 52 in the lining 40ª terminating at an internal opening 53 just below the neck 44.

Figure 10:
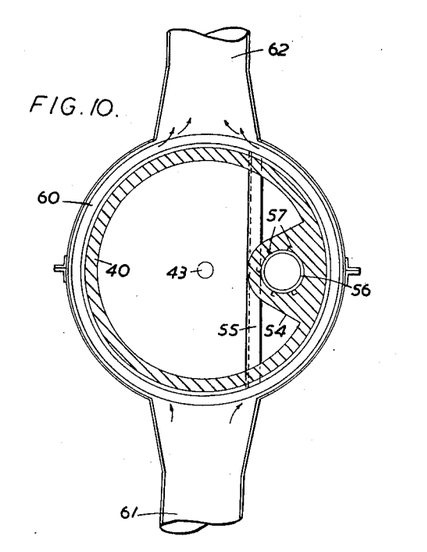
Figure 10 is a section on the line 10—10 of Figures 7 and 8.

In the vertical plane at right angles to the centre line of the troughs 46, 50 (Figures 8 and 10) the lining 40, 40ª is extended inwardly to form a vertical internal rib 54 supported on an angle section beam 55 and bracket 55ª and enclosing the upper part of a vertical steel pipe 56, which is bonded into the rib 54 by means of hooks 57 and extends from above the top of the separator, where it is closed by a cover 58, to near the bottom of the separator, its lower end being open. A horizontal pipe 59 branches from pipe 56 at a slightly lower level than the floors of troughs 46, 50 and is connected to the pipe 38, hereinbefore mentioned (see Figures 2, 3).

The upper part of the shell 39 is surrounded by a sheet metal jacket 60 having an inlet 61 and an outlet 62 whereby cooling air is circulated through the jacket. A similar sheet metal jacket 63 with inlet 64 and outlet 65 serves for circulating heated air round the lower part of the shell 39.

The blast furnace gases containing zinc-vapour (Figures 1 and 2) pass from the furnace outlet 15 through passage 16, without sensible loss of temperature, into the condenser compartment 18 where they meet a shower of molten lead thrown up by the rotor 22 and are thereby shock-chilled so that a part of their zinc-vapour content is condensed and dissolved by the molten lead without serious oxidation or the formation of obnoxious quantities of blue-powder. The gases, still containing some zinc-vapour, then pass through opening 21 into compartment 19 to meet a second shower of molten lead thrown up by rotor 23, whereby further condensation and solution of zinc is effected. The gases, now substantially stripped of zinc-vapour, finally leave the condenser by the outlet 26, uptake 27 and downwardly extending pipe 28 to enter the gas-cleaning apparatus.

Molten lead continuously enters the compartment 19 through pipe 38 and leaves this compartment, after dissolving some zinc, by way of channel 31 to enter compartment 18, in which it dissolves more zinc. Some of the lead thrown up by the rotor 22 in this compartment falls into the elevated trough 32, whence it runs through opening 33, well 34, opening 36 and trough 35 into the trough 46 of the zinc-separator 13, the openings 33 and 36 being drowned. Any overflow from trough 32 escapes over the lower of its walls back into compartment 18. The hanging wall constituted by the part of partition 20 above the opening 21 ensures that no large amount of lead is splashed directly into trough 32 from compartment 19, having regard to the direction of rotation of rotor 23.

The zincy-lead received by trough 46 (Figure 9) flows into arcuate trough 47 and down through the channels 48 and openings 49 into the chamber of the separator, while molten lead from the bottom of the separator containing a smaller amount of dissolved zinc flows up pipe 56 (Figure 2) and out through pipe 59 to enter compartment 19 of the condenser by pipe 38.

The upper part of the separator chamber (Figures 8 and 10) is cooled by the air flowing through jackets 60, causing some of the zinc to separate from the molten lead as a zinc-rich alloy containing a small amount only of lead and to float on the top of the body of lead in the separator chamber, the level of the face of separation being indicated (Figure 8) by dotted line 69, which is above the openings 49 of channels 48. Cooling of the zincy lead in the well 34 and trough 35, leading to premature separation of zinc, is minimised by roofing the well and trough as previously described.

The separated zinc flows out (Figure 7) by openings 53, channel 52, well 50ª and trough 50 into the zinc-collector 14 (Figure 2), the hanging wall 51 (Figure 7) providing an air seal for the interior of the separator-chamber.

Figure 8:
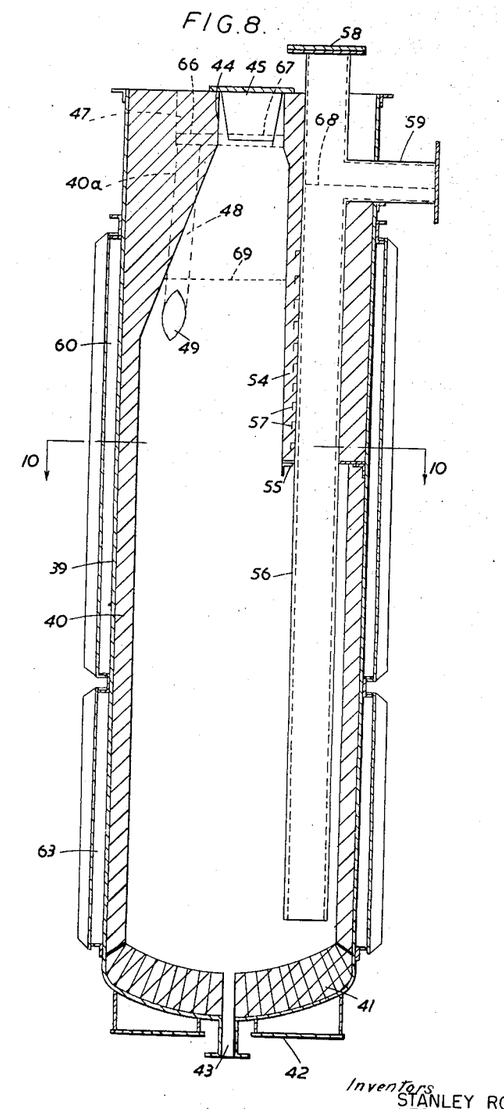
Figure 8 is a central vertical section of the zinc-separating component on the line 8—8 of Figures 9 and 10.

The levels of molten metal in the trough 46, and neck 44 and in trough 50 are indicated by dotted lines 66, and 67, respectively (Figure 7), and the level of molten lead in the pipe 59 by dotted line 68 (Figure 8). The trough 50 terminates in a spout delivering into the collector 14 and the level of the floor of trough 50 determines the level 67 within narrow limits depending on the rate of flow in the trough 50, the width of the trough being great enough to enable a shallow stream of molten metal to maintain the required flow-rate, whereby variations of the level 67 due to variations of flow-rate, being expressible as fractions of the mean depth of the stream, are minimised. The vertical distance between levels 67 and 68 determines the depth of the zinc layer from level 67 to the separation level 69 in accordance with elementary hydrostatic principles, having regard to the density ratio of the two liquids, viz. lead saturated with zinc and zinc saturated with lead, at the temperature of the upper part of the separator chamber.

The circulation is maintained by gravity owing to the head provided by the difference between the level 66 of the zincy-lead in the trough 46, which is determined by its level (Figure 1) in trough 32, and the level 68 of the lead in pipe 59, there being no great difference of density between the liquid filling channels 48 and in trough 47, 46 and that filling pipe 56 and in pipe 59.

The channels 48 are inclined so as to give the zincy-lead flowing down them a tangential entry into the separator-chamber, thus assisting even distribution of flow down the chamber.

The jacket 63 is thermostatically controlled to maintain a predetermined temperature—say 450° C.—higher than the melting point of zinc saturated with lead, viz. 418° C., in the lower part of the separator chamber. Zincy-lead enters the chamber through openings 49 at a higher temperature. Its excess heat is extracted by the cooling air circulated through jacket 60 thus maintaining the upper part of the chamber at substantially the same temperature as the lower part, any tendency for the upper part to be cooled below the temperature maintained in the lower part being prevented by convection.

The percentage of zinc separated from the lead in the separator represents the difference between the zinc concentration in the lead leaving the outlet 33 of the condenser compartment 18 and that in lead saturated with zinc at the temperature of the separator 13. The lead leaving the condenser is not usually saturated with zinc.

Lead enters the condenser compartment 19 from the separator 13 at the separator temperature—say 450° C. As it passes through the condenser in counter-current to the furnace gases, condensing zinc-vapour as it goes, it receives the heat of condensation and takes up heat from the non-condensable gases and its temperature therefore rises, the temperatures of the compartments 18, 19 being regulated, e. g. by adjusting the amount of external lagging, which may be provided by removable refractory blocks (not shown), so that the lead leaves the compartment 19 by passage 31 at a temperature between 450° C. and 500° C. and leaves compartment 18 by the trough 32 and well 34 at a temperature between 550° C. and 620° C.

It will be evident that no zinc can be separated until the lead has been recirculated through the condenser and separator until the body of lead in the separator is saturated with zinc at the temperature at which the separator is maintained. At 418° C. the zinc-concentration in this body of lead is about 1.7% and at 450° C. about 2.2%. Once this concentration has been attained any further zinc condensed from the furnace gases is separated substantially completely and recovered in the collector 14.

The efficiency of extraction then equals the efficiency of condensation, and this depends on ($a$) the temperature at which the furnace gases leave the condenser, which, ideally is little above the temperature of the lead bath in the second condensing zone 19, and ($b$) the concentration of zinc-vapour in the gases entering the first condensing zone 18. The first factor ($a$) determines the partial pressure of zinc-vapour in the gases leaving the second condensing zone and hence the zinc-vapour concentration in the spent gases. The condensation efficiency is measured by the difference between the initial and final ratios of zinc-vapour to inert gas divided by the initial ratio. If the temperature ($a$) is 450° C., the partial pressure of zinc-vapour over lead is approximately 0.36 mm. Hg, and the corresponding concentration in the spent gases is 0.047%; if the initial concentration in the furnace gases is 5% the ideal condensation efficiency is just over 99%, being given by the equation:

$$\text{Efficiency (percent)} = 100 \times \frac{5/95 - 0.047/99.953}{5/95} = 99.11$$

In practice, of course, it is bound to be somewhat lower, but by suitably matching the mass-flow-rates of the furnace gases and of the circulation of molten lead in a condenser and separator whose capacities are suitably matched to that of the furnace, a close approach to the ideal efficiency may be achieved.

In a plant as described above the rate at which lead is circulated is about 100 times the rate of zinc production, by weight, e. g. for a zinc output of 10 tons per diem, the lead circulation would be about 1000 tons per diem. The total weight of lead in the circuit is not critical, but in a plant having an output of 10 tons of zinc per diem about 70 tons would be a suitable figure for the total amount of lead in the circuit.

Figure 11:
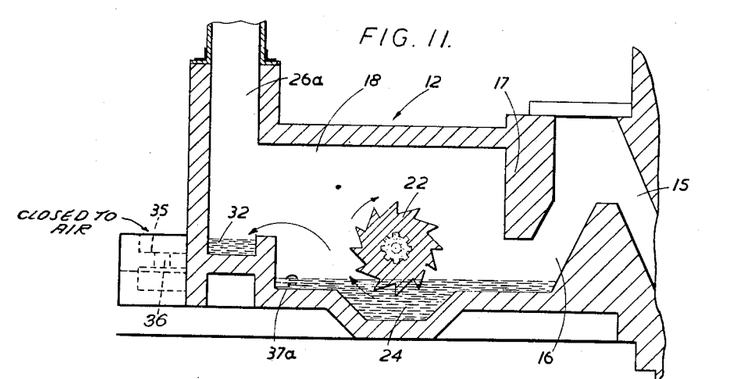
Figures 11 and 12 are partial views, similar to Figures 1 and 2, respectively, illustrating a modified arrangement.
Figure 12:
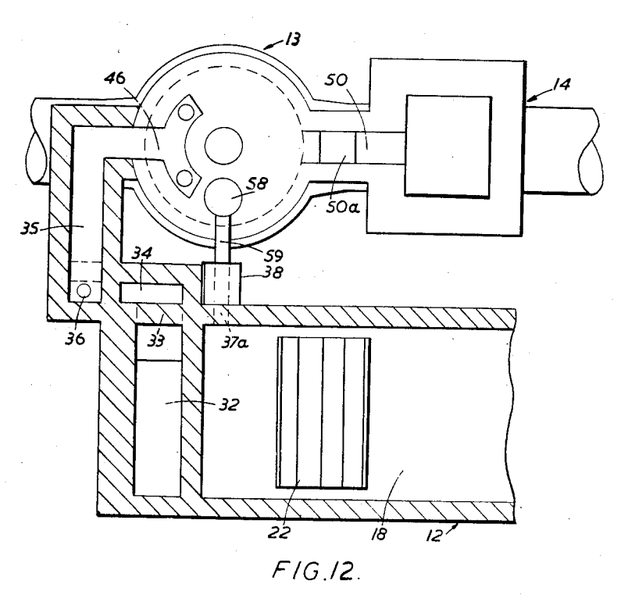

The process as above described may be modified and simplified by using single-stage condensation in which case the apparatus is similar, but modified as shown in Figures 11 and 12, the second condenser compartment 19 and rotor 23 of Figures 1 to 3 being omitted and the pipe 38, which is connected with the pipe 59 of the separator 13, communicating with an opening 37$^a$ in the bottom of compartment 18, while the gas outlet 26$^a$, corresponding to outlet 26 of Figures 1 and 3 is located above the trough 32 in compartment 18 (see Figure 1$^a$).

With single-stage condensation the temperature of the compartment 18 is regulated so that the lead leaving it by trough 32 and well 34 has a temperature between 500° C. and 550° C., the process being otherwise as previously described.

We claim:

1. In apparatus for producing zinc from a gaseous zinc vapor mixture obtained from a zinc smelting furnace, the improvement comprising a condenser with a confined condensing chamber, a sump at the bottom of the condenser for holding a circulating body of molten condensing metal and collecting condensed zinc therein, a gas inlet at one side of the chamber above the sump for the passage of the gaseous mixture from the smelting furnace to the condensing chamber, a gas outlet at the opposite side of the chamber above the sump for the escape of spent gases, a molten metal inlet to the sump for the entrance of the molten condensing metal, an elevated trough extending at least in part across the chamber above the sump, means in the chamber for elevating molten zinc-enriched metal from the sump to the trough, and a molten metal outlet at the trough for the passage from the chamber of the elevated molten zinc-enriched metal under hydrostatic-head.

2. Apparatus according to claim 1, in which the means for elevating the molten zinc-enriched metal includes a splash rotor disposed in part in the sump and in part in the space above the sump adjacent the elevated trough, said rotor being rotatable in a direction to splash molten zinc-enriched metal from the sump into the trough.

3. Apparatus according to claim 1, in which the means for elevating the molten zinc-enriched metal includes a horizontally disposed splash rotor disposed in part in the sump and in part in the space above the sump adjacent the elevated trough, said rotor being rotatable in a direction to splash molten zinc-enriched metal from the sump into the trough.

4. Apparatus according to claim 1, in which the molten metal outlet at the trough connects with a separator for separating zinc from the molten zinc-enriched metal.

5. Apparatus according to claim 1, in which the molten metal outlet at the trough connects with a separator for separating zinc from the molten zinc-enriched metal, and a molten metal outlet connects the separator with the molten metal inlet to the sump.

6. Apparatus according to claim 1, in which the molten metal outlet at the trough connects with a separator for separating zinc from the molten zinc-enriched metal, and a molten metal outlet connects the separator with the molten metal inlet to the sump on substantially the same level so that a continuous stream of molten condensing metal may flow by gravity from the separator to the sump of the condenser.

7. Apparatus according to claim 1, in which a lower smaller sump depends from the first sump, and the means for elevating the molten zinc-enriched metal includes a splash rotor disposed in part in the lower and upper sumps and in part in the space above the upper sump adjacent the elevated trough.

8. Apparatus according to claim 1, in which the condenser is divided into at least two condensing chambers, each chamber having its own sump; the sumps and the chambers are separated from each other by a foot-wall extending at least in part between them; the elevated trough is disposed in the first chamber, adjacent the furnace; a molten metal passageway connects the sumps so that molten zinc-enriched metal may flow from the second sump to the first sump by gravity; the gas inlet for the gaseous mixture connects the first chamber; a gas passageway above the foot-wall connects the chambers so that partially spent gaseous mixture may pass from the first chamber to the second chamber; the gas outlet for the spent gases connects the last chamber; the elevating means is disposed in the first chamber for elevating molten zinc-enriched metal from its sump to the trough; and the molten metal inlet for the entrance of the molten condensing metal connects the sump of the second chamber.

9. Apparatus according to claim 8, in which a hanging-wall depends from the top of the condenser between the two chambers and above the foot-wall to separate the chambers and to define the gas passageway between them.

10. Apparatus according to claim 8, in which the means for elevating the molten zinc-enriched metal includes a splash rotor disposed in part in the sump of the first chamber and in part in the space above the sump adjacent the elevated trough, said rotor being rotatable in a direction to splash molten zinc-enriched metal from the latter sump into the trough.

11. Apparatus according to claim 8, in which the means for elevating the molten zinc-enriched metal includes a horizontally disposed splash rotor disposed in part in the sump of the first chamber and in part in the space above the sump adjacent the elevated trough, said rotor being rotatable in a direction to splash molten zinc-enriched metal from the latter sump into the trough.

12. Apparatus according to claim 8, in which the molten metal outlet at the trough connects with a separator for separating zinc from the molten zinc-enriched metal.

13. Apparatus according to claim 8, in which the molten metal outlet at the trough connects with a separator for separating zinc from the molten zinc-enriched metal, and a molten metal outlet connects the separator with the molten metal inlet to the sump of the second chamber.

14. Apparatus according to claim 8, in which the molten metal outlet at the trough connects with a separator for separating zinc from the molten zinc-enriched metal, and a molten metal outlet from the separator connects with the molten metal inlet to the sump of the second chamber on substantially the same level so that a continuous stream of molten condensing metal may flow by gravity from the separator to the latter sump.

15. Apparatus according to claim 8, in which a lower smaller sump depends from the sump of the first chamber, and the means for elevating the molten zinc-enriched metal includes a splash rotor disposed in part in the lower and upper sumps and in part in the space above the upper sump adjacent the elevated trough, said rotor being rotatable in a direction to splash molten zinc-enriched metal from the latter sumps into the trough.

16. Apparatus according to claim 8, in which a splash rotor is disposed in part in the sump of the second chamber and in part in the space above the sump, said rotor being rotatable in a direction to splash molten zinc-enriched metal from the latter sump in a direction generally away from the trough.

17. Apparatus according to claim 8, in which a lower smaller sump depends from the sump of the second chamber, and a splash rotor is disposed in part in the latter lower and upper sumps and in part in the space above the upper sump, said rotor being rotatable in a direction to splash molten zinc-enriched metal from the latter sump in a direction generally away from the trough.

References Cited in the file of this patent

UNITED STATES PATENTS

| | | |
|---|---|---|
| 2,473,304 | Robson | June 14, 1949 |
| 2,668,047 | Robson et al. | Feb. 2, 1954 |